United States Patent [19]

Mitchell

[11] 4,244,016
[45] Jan. 6, 1981

[54] SINE-WAVE STATIC CONVERTER

[75] Inventor: Daniel M. Mitchell, Cedar Rapids, Iowa

[73] Assignee: Rockwell International Corporation, El Segundo, Calif.

[21] Appl. No.: 962,252

[22] Filed: Nov. 20, 1978

[51] Int. Cl.³ ............................................ H02P 13/20
[52] U.S. Cl. ........................................ 363/98; 363/79; 363/132
[58] Field of Search ....................... 363/15, 17, 37, 41, 363/50, 78–79, 89, 95, 97–98, 26, 131–134

[56] References Cited
U.S. PATENT DOCUMENTS

| 3,590,360 | 6/1971 | Puckette | 363/89 |
| 3,624,486 | 11/1971 | Oates | 363/41 X |
| 3,710,229 | 1/1973 | Jessee | 363/41 |
| 3,831,077 | 8/1974 | Richeson, Jr. | 363/50 X |

Primary Examiner—J. D. Miller
Assistant Examiner—Peter S. Wong
Attorney, Agent, or Firm—Richard K. Robinson; Howard R. Greenberg; H. Fredrick Hamann

[57] ABSTRACT

The method and apparatus of converting a sine-wave signal of one frequency to a sine-wave signal of a different frequency comprises a four port pass means that is controlled by at least two control signals. An error signal is generated by the difference between the rectified output signal and a locally generated reference signal. The error signal is compared to a high frequency sawtooth signal to provide a pulse width signal which generates a two state output signal. The first state is when the amplitude of the sawtooth signal is less than the error signal and the second state is when the amplitude of the sawtooth signal is greater than the amplitude of the error signal. The two state pulse width modulated signal is combined with the output from a polarity control means for obtaining the control signals.

4 Claims, 10 Drawing Figures

SINE-WAVE STATIC CONVERTER

The Government has rights in this invention pursuant to Contract No. F19628-76-C-0270 awarded by the Department of the Air Force.

BACKGROUND OF THE INVENTION

It has been found that the most efficient way to convert an alternating current (AC) signal of a first frequency to an alternating current signal of a second frequency or to invert a direct current (DC) signal to an alternating current signal is to use pulse duration modulation techniques. Reference can be made to the National Technical Information Service publication of the U.S. Department of Commerce, No. AD-A036 027 published January 1977 entitled "Trade-Off Investigations and Detailed Design of Power Inverters" by W. G. Lawrence.

In most inverter or converter systems, the input signal is applied to an input conditioner which is used to reduce the electromagnetic interference, perform voltage transformation, and in some cases provide isolation, regulation and protection for the remainder of the circuitry. The output of the input conditioner, which should be a direct current signal, is conducted to what is commonly referred to as the inverter power stage which performs the basic functions of the inverter by changing the direct current signal into an alternating current signal and provides regulation when not accomplished in the input conditioner. The output of the inverter power stage is passed to the output conditioner which, in general, is selectable so as to provide a selection of voltages. In addition, the output conditioner includes output filtering and may include input/output isolation if it is not provided elsewhere in the converter.

Voltage selection and isolation can both be accomplished easily by the use of an output transformer. The transformer secondaries can be rewired in series or parallel to provide the desired output voltages. There are transformerless output conditioners also known in the art and the selection of either the transformer type output conditioner or the transformerless type output conditioner is based upon the design application of the circuitry. However, in cases of a low frequency output voltage, a transformer if used, would be extremely bulky and in this case, the transformerless type output conditioner might be preferable. However, for AC to AC converter applications which require isolation, the transformer is part of the input conditioner or the output conditioner in accordance with the higher frequency.

The inverter power stage, because it controls the basic functions, is what determines the efficiency, accuracy and response time of the converter system. It has been found that the most advantageous type of inverter uses the technique of generating a high frequency rectangular waveform which is pulse duration modulated to synthesize the output sinewave while simultaneously controlling the amplitude and frequency of the output. The output filtering requirements are greatly reduced in that the filter need only remove the high frequency switching frequency from the output signals. Filter design is, therefore, relatively independent of the output frequency and the same filter may be used for the 60 hertz and 400 hertz outputs or for any other reasonable frequency design. An additional advantage is that the filter impedance is lower at the output frequency thus reducing the phase shift across the filter and minimizing the problems of parallel operations and operations with unbalanced loads.

In the prior art inverters as well as the inverter disclosed herein, the inverter power stage acts as a power amplifier for signals developed at lower levels by a signal generator and controller. Each inverter power stage requires the generation of single phase and/or three phase outputs of closely controlled frequency and amplitude. Alternative sine-wave sources include sine-wave oscillators, square-wave generators with filters, quasi-square-wave generators with filters and digital-to-analog converters.

It is a generally held opinion that the prior art sine-wave oscillator has two distinct disadvantages; two sets of frequency determining elements are required for the two outputs and for three-phase generation, the three oscillators must be kept precisely 120° apart in their phasing.

The square-wave generator source is simple to produce but filtering becomes a problem along with the need to maintain proper phasing with changes in component values. While the quasi-square-wave type signal generator reduces the filter demands, a three level logic signal is required which is not readily available from standard logic elements.

It is generally known in the prior art as can be referred to in the above reference publication that digital-to-analog converters are the most efficient signal generators. In this publication, it is stated that the digital-to-analog converter, while seeming more complicated at first glance, has distinct advantages over the other signal generator circuits. Each of the three separate phases may be derived from a common counter and control network driven by a single crystal controlled oscillator. The number of steps provided in the converter for synthesizing the sine-wave may be chosen to provide low distortion and minimum filtering and phase shift. By suitable selection of the oscillator frequency a single crystal oscillator can be used to provide 50, 60 or 400 hertz outputs just by changing the countdown between the oscillator and the digital-to-analog converter. The crystal controlled oscillator feeds a frequency controlled signal to the divider through controlled circuitry. This controlled circuitry may include synchronizing circuitry to synchronize interconnected inverters and/or synchronize the signal produced to a possible pulse duration modulator. In response to an input control signal, the counter decoder can provide outputs for the desired output frequency. DC outputs of the counter decoder are fed to the digital-to-analog converter to control the instantaneous relative amplitudes of synthesized sine-waves, and other outputs are fed to the polarity control circuits to control the polarities of the signals.

The main disadvantage of the above-described techniques and those described in the above-referenced publication, is that the AC output from the output conditioner is rectified and filtered to form a DC analog signal. Although the preferred embodiment of the prior art techniques previously described permit low output distortion using minimum passive filtering for steady state resistive loads, the closed loop frequency response in all of the above-described techniques is relatively low. This is because the limiting item in the loop is the low frequency filter associated with forming the DC analog of the AC output voltage rather than the AC output filter itself. Thus, even the D to A converter technique, as described, will generate high voltage transients in response to step load changes and, perhaps more significantly, will produce a distorted output voltage in the face of reactive or nonlinear loads. What is needed is a control loop which eliminates the necessity of forming a DC analog of the AC output voltage, thus permitting a frequency response fast enough to cause the various pulse widths of the pulse width modulated inverter to be individually modulated in accordance with the instantaneous load demands.

SUMMARY OF THE INVENTION

The method and apparatus of converting a sine-wave signal of one frequency to a sine-wave of a different frequency comprises a four port pass means that is controlled by at least two control signals. An error signal is generated by the difference between the rectified output signal and a locally generated reference signal. The error signal is compared to a high frequency sawtooth signal to provide a pulse width signal which generates a two state output signal. The first state is when the sawtooth signal is less than the error signal and the second state is when the amplitude of the sawtooth signal is greater than the amplitude of the error signal. The two state pulse width modulated signal is combined with the output from a polarity control means for obtaining the control signal.

The improved inverter control scheme basically compares an isolated scaled down AC signal of the AC output directly to the output of an internal sine-wave reference oscillator. In particular, a full wave rectified analog of the AC output is fed to an error amplifier along with the full wave rectified reference voltage. The pulse widths of the individual pulses are determined by the comparison of the error amplifier output and the high frequency sawtooth voltage. A fundamental frequency logic waveform is derived from the sine-wave oscillator which combines with the comparator output in such a way as to direct the chopped pulses to the proper sets of power transistors for the particular fundamental half cycle. With this control, the closed loop frequency response is limited only to the AC output filters whose bandwidth is determined by the chopping frequency and not the fundamental frequency. By chopping at a frequency high enough so that the AC output filter does not create a significant phase shift at the fundamental frequency, the sine-wave reference may be satisfied on a moment to moment basis just as the DC reference is satisfied on a long term basis in the prior art. A resultant improvement is that the waveshape itself is accurate as well as its peak or average value.

Also provided is the apparatus necessary to implement a three-phase embodiment of the invention.

Many other objects and purposes of the invention will be clear from the Detailed Description of the Drawings.

DETAILED DESCRIPTION OF THE DRAWINGS

Figure 1:
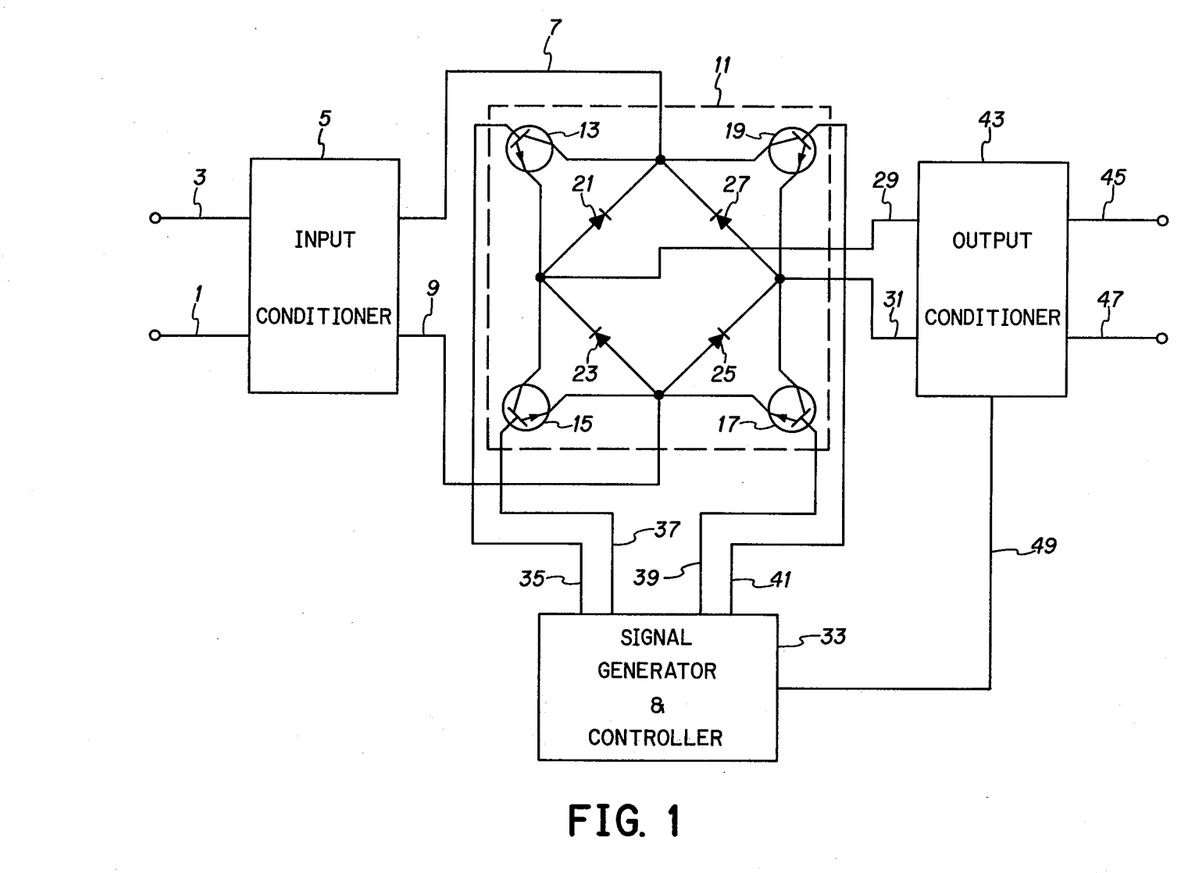
FIG. 1 is a block diagram of a sine-wave signal inverter.

Referring to FIG. 1, an input signal is applied across conductors 1 and 3 from a source (not shown) which conducts the input signal to the input conditioner 5. The input conditioner provides filtering and AC to DC conversion of the input signal if the input signal is an AC signal and also provides isolation if it is not provided elsewhere, such as in the output conditioner 43. If the input signal is not an AC signal, then the input conditioner provides only isolation filtering, energy storage and input protection. The output signal that is present on conductors 7 and 9 is carried to a controllable signal pass means 11 which can be a device such as a transistor/diode bridge. The bridge configuration utilizes the transistors 13, 15, 17 and 19 as controlled power switches and the diodes 21, 23, 25 and 27 are used to permit the passage of reverse currents from reactive loads. When transistors 13 and 17 are on, transistors 15 and 19 are off, and the output voltage that appears on conductors 29 and 31 is approximately equal to the input voltages that appear across conductors 7 and 9. When transistors 15 and 19 are turned on and transistors 13 and 17 are turned off, the voltages across the conductors 29 and 31 are approximately equal to minus the voltage that is present on conductors 7 and 9. When the transistors 13 and 19 or 15 and 17 are on, the voltage on conductors 29 and 31 is approximately equal to zero. The state in which transistors 13 and 15 or 17 and 19 are on should not be allowed in that these states represent a short circuit to the input conditioner 5. The respective transistor base drives which are generated by the signal generator and controller 33 are coupled to the bases of the transistors by conductors 35, 37, 39 and 41 and sequenced to achieve the three preferred states in alternating fashion. It should be noted that the transistor designations of on and off imply control states rather than load current paths. For example, when the load is reactive, the actual current path would be through a combination of diodes and transistors. The point is, even though there is a variety of output states, there are only three control states, and these are a positive voltage across the conductors 29 and 31, a negative voltage across conductors 29 and 31 and a zero voltage across conductors 29 and 31. Therefore, a minimum of control lines can be used to control the transistors 13, 15, 17 and 19 by connecting bases of transistors 13 and 17 to one control line and the bases of transistors 15 and 19 to the other control line. However, for the cases where the load is reactive, then in the state in which there is a zero voltage across conductors 29 and 31, either transistor pair 13 and 19 or transistor pair 15 and 17 should be on. To achieve this preferred zero state requires more than two control lines.

The output voltage that is present on conductors 29 and 31 is passed through the output conditioner 43 and appears across the conductors 45 and 47. There is also present a conductor 49 that monitors the output conditioners and provides a feedback signal back to the signal generator and controller 33.

Figure 2:
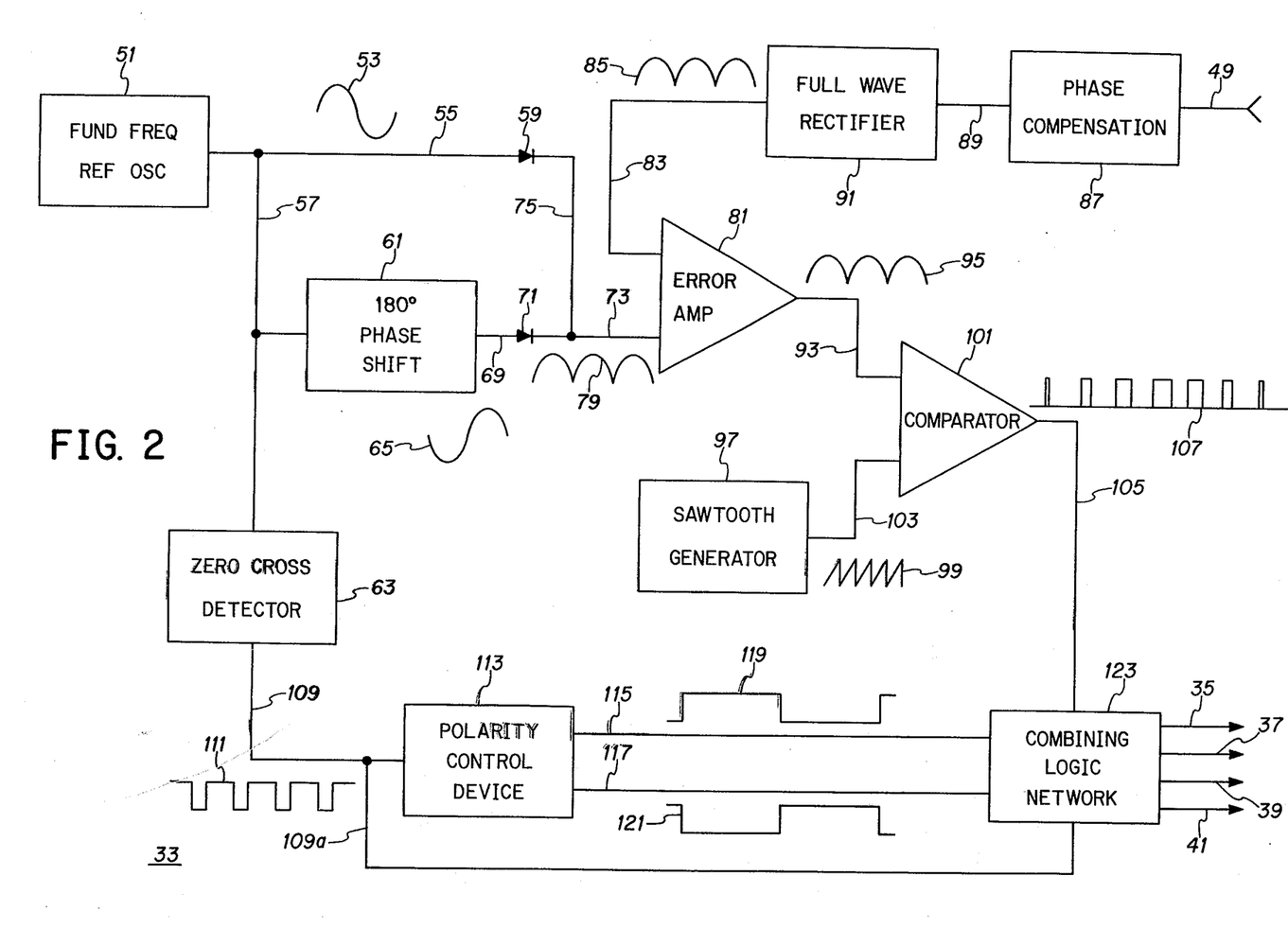
FIG. 2 is a block diagram of the signal generator and controller of the inverter of FIG. 1.

Referring to FIG. 2, which is a block diagram of the signal generator and controller 33 of FIG. 1, there is present a fundamental frequency reference oscillator 51 that provides a basic reference frequency shown by the waveform at 53 which is equal to the desired output frequency of the inverted signal that appears across conductors 45 and 47 of FIG. 1. The signal that is represented by the waveform at 53 is coupled by conductor 55 to diode means 59 and also by conductor 57 to the 180° phase shift device 61 and also to a zero cross detect circuit 63. The 180° phase shift device 61 phase shifts the signal as represented by the waveform at 53 by 180°, the output of which is represented by the waveform at 65. The output of the 180° phase shift device is connected to diode means 71 by means of conductor 69. The two diodes 59 and 71 in conjunction with the 180° phase shift device perform full wave rectification on the signal that is represented by the waveform at 53 and provide the full wave rectified signal on conductor 73 which is joined to diode 59 by conductor 75 and diode 71 by conductor 77. The full wave rectified signal's waveform is shown at 79. Conductor 73 conducts the full wave rectified signal to error amplifier 81 which provides a difference signal of the full wave rectifier signal and the feedback signal that is present on conductor 83. The signal that is present on conductor 83 is a full wave rectified signal represented by the waveform at 85 of the output signal that is present at the output conditioner 43 of FIG. 1. The signal is coupled by conductor 49 to a phase compensation network 87 which insures that the phase of the signal present on conductor 83 is the same phase of the reference signal that is present on conductor 73 and also provides for overall loop stability. After passing through the phase compensation network, the signal is coupled by conductor 89 to a full wave rectifier means 91 which rectifies the signal to produce a signal that can, as was mentioned earlier, be represented by the waveform at 85.

The error amplifier 81 generates an output signal that is proportional to the difference of the signal that is present on conductor 73 and the signal that is present on conductor 83 and provides an error signal on conductor 93 that can be represented by the waveform shown at 95.

There is also present within the signal generator and controller 33 a sawtooth generator means 97 which produces a signal that can be represented by the sawtooth waveform shown at 99 that has a frequency that is at least twice the frequency of the output signal present on conductors 45 and 47. However, as a rule, the higher the frequency of the sawtooth signal from the sawtooth generator means 97 the better the integrity of the output waveform. This signal is conducted to a comparator 101 by conductor 103. The comparator 101 compares the signal on conductor 103 with the error signal on conductor 97 and provides a two state output. One state is during the time period in which the signal on conductor 103 is less than the signal on conductor 93, and the second state is when the signal present on conductor 103 is greater than the signal that is present on conductor 93. This two state output is provided on conductor 105 and it can be represented by the waveform shown at 107 which is also known as a pulse duration modulated waveform.

Each time the signal represented by the waveform 53 crosses the zero base line, the zero cross detect circuit 63 detects this crossing and provides a pulse output on conductor 109 that is represented by the waveform at 111 for each zero crossing with a delay determined by the threshold of the zero crossing detector. The pulses are coupled to a polarity control device 113, which may be a device such as a J-K flip-flop, by conductor 109. There are two complementary outputs from the polarity control device 113. One output is present on conductor 115 and represented by the waveform at 119, and the complement of the signal on conductor 115 is present on conductor 117 and represented by the waveform at 121. These signals are conducted to a combining logic network 123 which combines the pulse width modulated waveform present on conductor 105 with the polarity control waveforms present on conductors 115 and 117 as well as the pulses from the zero detect circuit which is connected to the combining logic network by conductor 109a to provide the control signals for the base drives of transistors 13, 15, 17 and 19 of FIG. 1 on conductors 35, 37, 39 and 41 respectively.

Figure 3A:
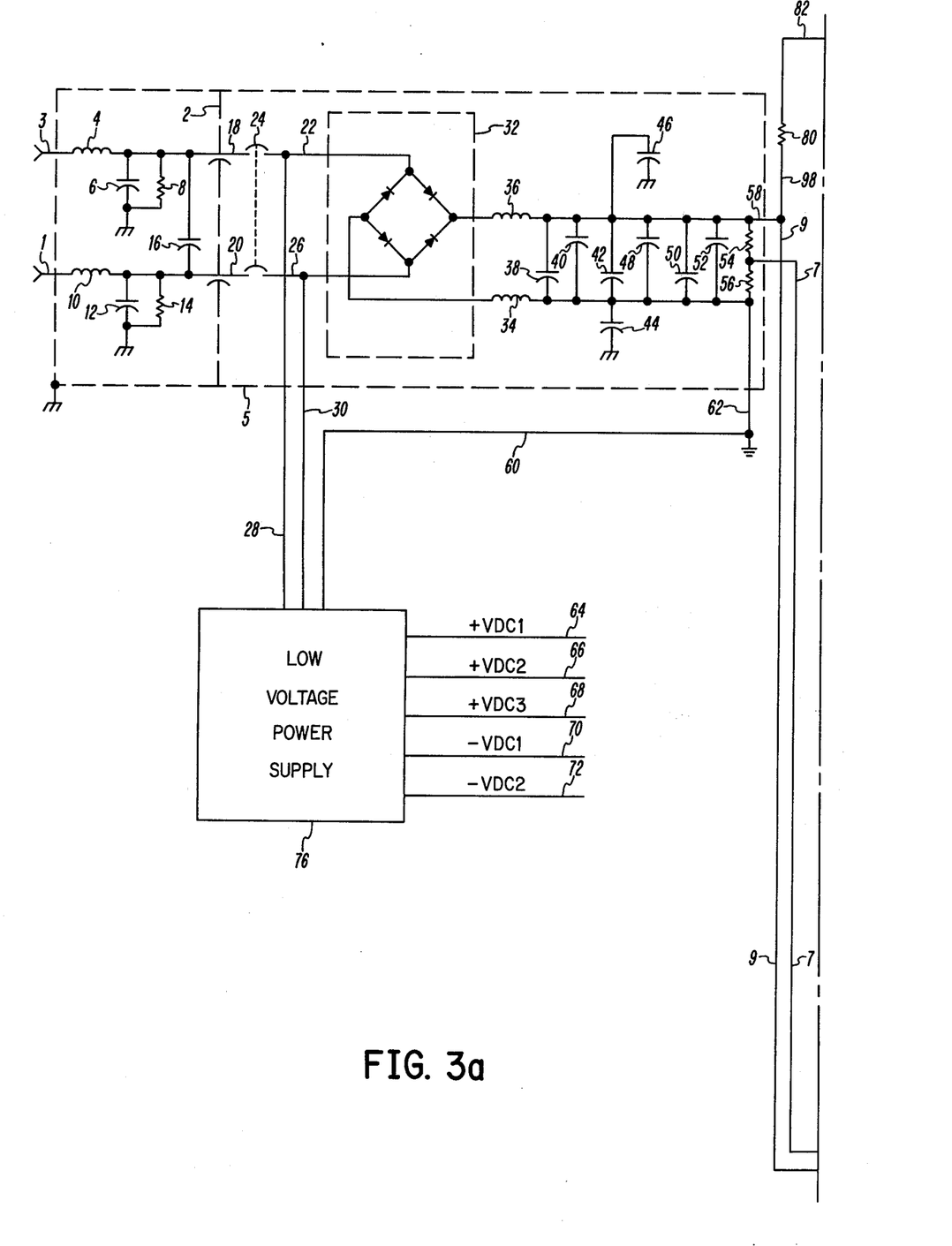
FIGS. 3a through 3e are schematic diagrams of a preferred embodiment of the invertion.

Referring to FIG. 3a, which is a schematic diagram of the preferred embodiment of the invention, the input conditioner 5 receives the input signal across conductors 1 and 3 and couples it to a shielded input filter circuit that includes a shielded section 2. The input filter circuits, in conjunction with the shielding section 2, provides for reduction of conducted electromagnetic interference and consists of a filtering network that includes inductors 4 and 10, capacitors 6, 12, 16 and resistors 8 and 14. The output from the input filter that is present on conductors 18 and 20 and is connected to a circuit breaker device 24.

The filtered output after passing through the circuit breaker device is present on conductors 22, 26, 28 and 30. Conductors 28 and 30 connect the input voltages to the low voltage power supply 76. The low voltage power supply 76 provides the operating voltages for the circuitry and, depending upon the selection of the circuit components, the output voltages and the number of the output voltages are readily determinable based upon the circuit's parameters and the selected voltage levels of the inverter. However, as shown in FIG. 3a there are three positive DC voltages present on conductors 64, 66 and 68 respectively, and two minus DC voltages present on conductors 70 and 72 respectively. These voltages which for simplification of the drawings are not shown are conducted throughout the remaining circuitry supplying the operational voltages to the circuit components.

Conductors 22 and 26 couple the input voltage to a full wave rectifier device 32. The output rectified voltage is coupled to a filter network that includes inductors 34 and 36, and capacitors 38, 40, 42, 48, 50 and 52, as well as energy storage means provided by capacitors 44 and 46. It should be noted that in the case where the input signal is a DC signal then the full wave rectifier device 32 is not necessary and should not be included within the invention. The output voltage is provided across conductors 58 and 62. The voltage that is carried to the controllable pass device 11 on FIG. 3e is present on conductors 7 and 9. Conductor 58 is also connected to conductor 98 which has in series a current limiting resistor 80, which is in series with conductor 82.

Figure 3B:
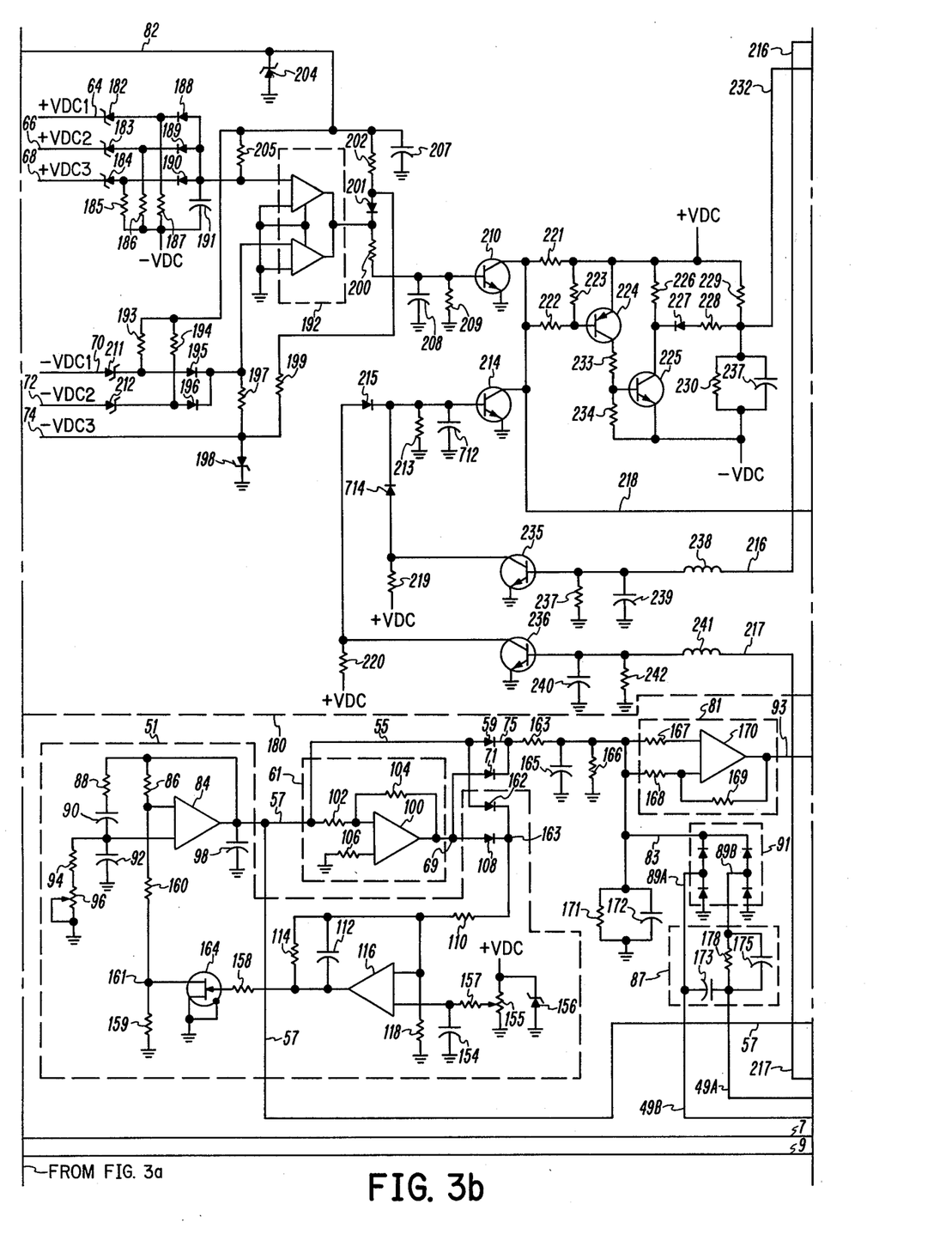

Referring to FIG. 3b, the fundamental frequency reference oscillator which is shown as a feedback controlled Wien-bridge oscillator and includes an oscillator amplifier means 84 having a feedback loop consisting of resistors 86 and 88 and capacitor 90. Capacitor 92 and resistors 94 and adjustable resistor 96 provide a means for controlling the frequency of the oscillator. The output of the oscillator amplifier 84 is present on conductor 57 and is filtered by capacitor 98. Conductor 57 connects the output of the fundamental reference oscillator 51 to conductor 55 which is connected to the diode 59 as well as to the 180° phase shift device 61 which includes an amplifier 100 having an output gain established by resistors 102, 104 and 106. The output of the amplifier 100 is present on conductor 69 and is connected to diode 71 and also to diode 108 which is part of the feedback loop for the fundamental reference frequency oscillator 51.

The output of the fundamental frequency oscillator 51 is a sine-wave whose amplitude is controlled by a feedback loop that includes amplifier 116 and field effect transistor (FET) 164. Amplifier 116 generates an error signal from the difference of the full wave rectified output of the oscillator amplifier 84, as is provided at node point 163, and the reference that is established by the parallel combination betwen a positive DC voltage source and ground of zener diode 156 and adjustable resistor means 155. The gain of amplifier 116 is provided by resistors 110, 118, 157 and 114. Capacitor 154 provides filtering and capacitor 112 provides the breakpoint for amplifier 116.

Amplifier 164 is used as an a means for amplifying the error signal that is present on the output of amplifier 116 and includes the gate resistor 158. The FET amplifier controls the current flowing through resistors 160 and 159 and thus the amplitude of the output signal from the oscillator amplifier 84.

The output of diodes 59 and 71 is present at node point 75 and is coupled by resistor 163 to error amplifier 81. The error amplifier consists of amplifier 170 and resistors 167, 168 and 169. Capacitor 165 is for high frequency decoupling of the full wave rectified signal. Conductors 49a and 49b pick up the output of the converter as shown on FIG. 3e and apply it to the phase compensation network 87 which consists of capacitors 173 and 175, and resistor 178. Conductors 89a and 89b interface the phase compensation shift network with the full wave rectifier device 91, the output of which appears on conductor 83 which couples the signal into the error amplifier 81. High frequency decoupling is provided by capacitor 172 and a voltage dividing function is provided by resistors 171 and 178.

Figure 3C:
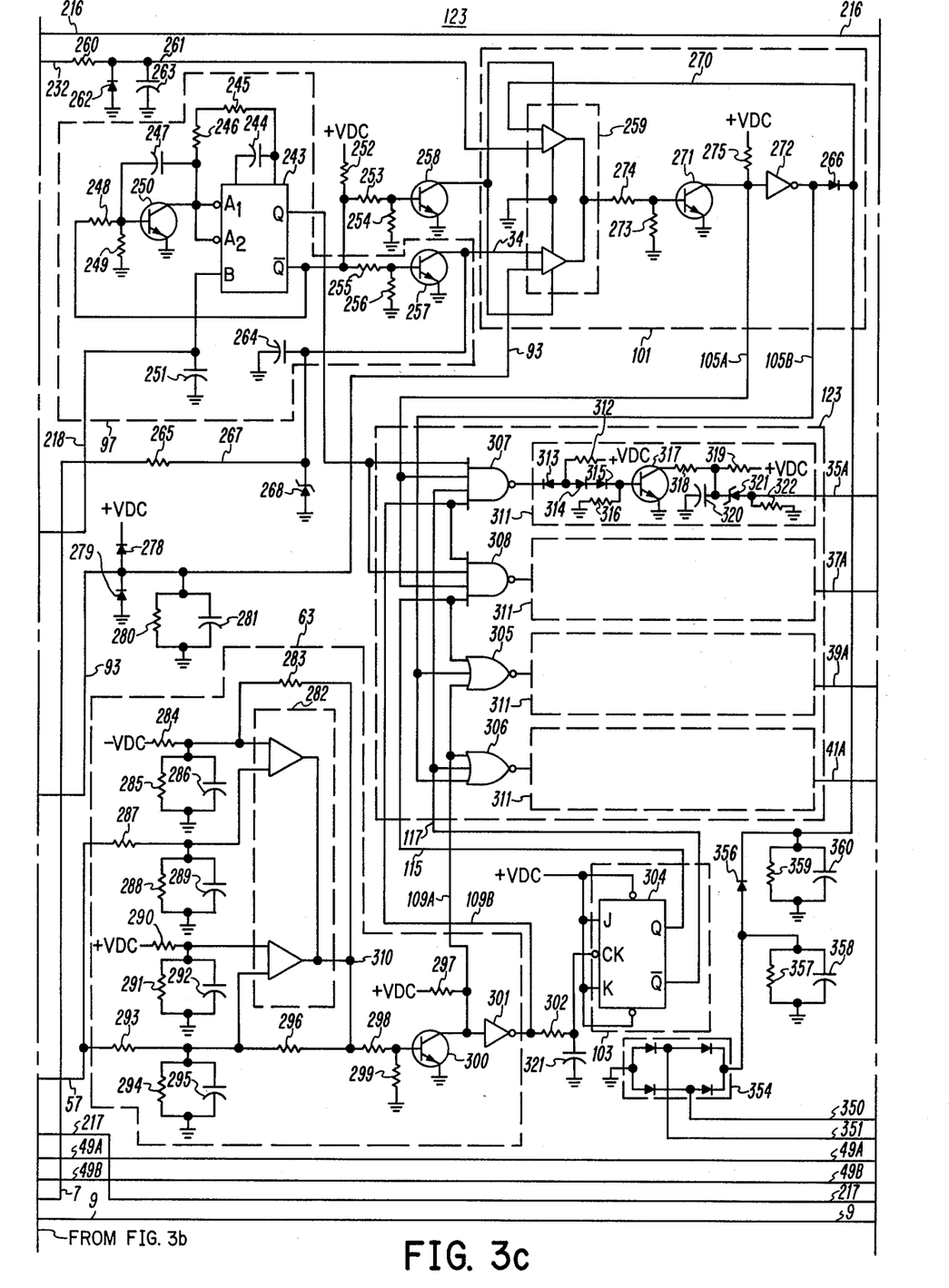
Figure 4:
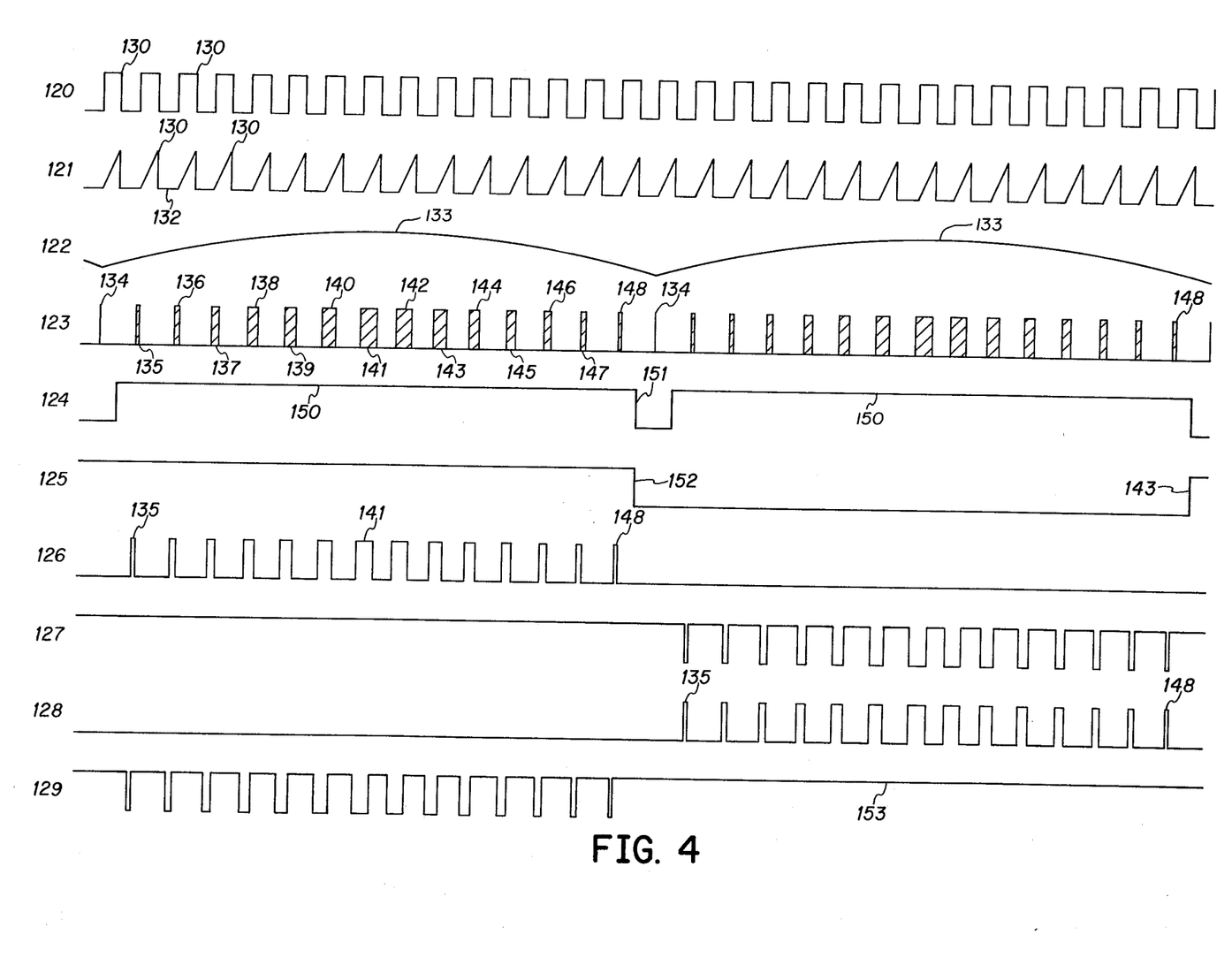
FIG. 4 is a waveform diagram of the signals that are present in the embodiment of FIG. 3.

The output error signal from the error amplifier is conducted by conductor 93 to the combining logic network 123 shown in FIG. 3c and is represented in FIG. 4 by waveform 122, which as shown, is a full wave rectified waveform having equally spaced maximum amplitude points at 133.

To prevent current surges upon the initialization of the inverter, there is provided a soft start and enable circuit 180, whose major components include voltage comparator means 192 and transistor switch means 210 and 214. Upon the closing of circuit breaker 24 on FIG. 3a, low voltage power supply means 76 provides the operation voltage to transistors 210 and 214 and voltage comparator means 192 disabling the enable conductor 218. At this stage voltage comparator means compares the OR'D positive voltage that has been normalized by zener diodes 182, 183 and 184 and resistors 185, 186 and 187 and OR'D by diode or circuit that includes diodes 188, 189 and 190 with the common return line. In a similar manner, the negative DC voltages are normalized by zener diodes 211 and 212 and resistors 193 and 194, OR'D by the diode OR circuit that includes diodes 195 and 196, and then compared to the common return by voltage comparator means 192. The third negative DC voltage is provided at the node of resistor 197 and zener diode 198. When all of the voltages are present, the output of the voltage comparator means 192 will go negative causing transistor 210 to turn off.

Positive biasing of the voltage comparator device is provided by the positive voltage that is present on conductor 82 from FIG. 3a, which is maintained at a constant level by zener diode 204 and filter capacitor 207, and resistors 202 and 205. Negative biasing is provided by resistor 199, which is connected to negative DC source of the node of resistor 197 and zener diode 198, and diode 201.

In the initial state, transistors 235 and 236 are off and transistor 214 is on, thus disabling the soft start generator that includes transistors 224 and 225. Conductors 216 and 217 are connected to a circuit that monitors positive and negative DC voltages to the base drive circuits on FIG. 3d. When these voltages are present, transistors 235 and 236 turn on which causes transistor 214, which is biased on by the current flowing through resistor 213, 219 and 220 and diodes 714 and 215 to turn off. The signal present on conductors 216 and 217 is filtered by the inductor, capacitor combination of 238, 239 and 240, 241 respectively. Biasing for transistor 234 is provided by the current flowing through resistors 237 and 219 and transistor 236 by the current flowing through resistors 220 and 242.

When both transistors 210 and 214 turn off, the forward biasing that was present on the base of transistor 224 as a result of the current flowing through resistors 221, 222 and 223, is turned off. This is turn removes the forward bias that is developed by the current flowing through resistors 233 and 234 from the base of transistor 225 turning transistor 225 off. Prior to transistor 225 being turned off, there is a negative potential on the cathode of diode 227 which causes a negative potential to be present on capacitors 237 and 263 (in FIG. 3c) as a result of the current flowing through transistor 225. When transistor 225 is turned off, diode 277 is reverse biased and the current flowing through resistor 229 and 230 will cause capacitors 237 and 263 to slowly charge up providing a soft start signal to the comparator 101 which gradually goes positive at a rate determined by the time constant established by capacitors 237 and 263 and resistor 260 in conjunction with the input impedance of voltage comparator means 259. Diode 262 on FIG. 3c protects the voltage comparator means 259 from negative voltage levels greater than its voltage rating.

In FIG. 3c the sawtooth generator 97 is shown and consists in part of a multivibrator 243. The $\overline{Q}$ output of the multivibrator 243 which is represented by waveform 120 of FIG. 4 is connected to two switching transistors 257 and 258 and is also tied to a positive voltage by means of a resistor 252 and to the base of transistors 257 and 258 by means of resistors 253 and 255, respectively. The bias for transistor 258 is established by the current flowing through resistors 253 and 254 while the bias for transistor 257 is established by the current flowing through resistors 255 and 256. The period for the multivibrator device 243 is established by capacitor 244 and resistors 245 and 246. In addition, switching transistor 250 is controlled by the $\overline{Q}$ output of the multivibrator 243 being connected to the base of transistor 250 by means of resistor 248, which its bias established by the current flowing through resistor 249. There is a collector to base capacitor 247 connected between the base of transistor 250 and the collector of the transistor.

During soft start operation, the soft start signal is coupled from conductor 232 from page 3b to page 3c and through resistor 260. Resistor 260 is connected to voltage comparator means 259 by means of conductor 261. The voltage comparator device 259 is strobed by transistor 258 which is driven by the $\bar{Q}$ output of multivibrator 243. When transistor 258 is off, the start signal that is present on conductor 261 is compared with the switched output of the voltage comparator device by way of a feedback conductor 270. When the voltage comparator device 259 switches on, transistor 271 turns on, pulling its collector essentially to ground, which causes a voltage to appear on the output of the inverter amplifier 272. The biasing for the transistor 271 is provided by the current flow through resistor 273 and the base current is limited by resistor 274. In addition, the collector of transistor 271 is tied to a positive DC voltage through pullup resistor 275. The positive going pulses from the inverting amplifier 272 forward biases diode 266 allowing the positive going pulse to be coupled by feedback conductor 270 into the voltage comparator 259. As was discussed in conjunction with FIG. 3b, after the soft start signal has stabilized, the comparison between the error signal from amplifier means 81 and the sawtooth generator 97 is operational.

The sawtooth signal that is applied to voltage comparator 259 is the result of the charging of capacitor 264 by means of the voltage that is present from FIG. 3a on conductor 7. This voltage is limited by resistor 265 and is clipped by zener diode 268. When the $\bar{Q}$ output of the multivibrator 243 is zero, capacitor 264 charges up and when the multivibrator 243 resets and the $\bar{Q}$ output goes positive, the charge on capacitor 264 is connected to ground by the operation of transistor switch 257. This causes a signal whose amplitude changes with time to be present on conductor 34 for a comparison with the signal that is present on conductor 93 which is the output of the error amplifier from FIG. 3b. The output of the error amplifier is coupled by conductor 93 into the voltage comparator 259 and is filtered by capacitor 281 with positive and negative clipping provided by diodes 278 and 279 and impedance matching of the error amplifier to the voltage comparator is provided by resistor 280.

For a better understanding of the operation of the voltage comparator reference should be made at this time to FIG. 4, in which the signal that is present on conductor 93 is represented by the waveform 122 and the signal that is present on conductor 134 is represented by waveform 121. The comparison of these two signals is provided by the waveform 123 in which the pulse width of the waveform is established by the amount of time after the transistor 288 has turned on until the amplitude of the sawtooth peak 131 exceeds the amplitude of the waveform 122. It thus can be seen by comparison of the pulses, that as the amplitude of the waveform 122 increases, the pulse widths of the waveform at 123 increase. This can be readily seen by comparison of the pulses 135 through 148 to each other. The widest pulse which occurs at the completed peak 133 of the waveform 133 is the pulse located at 141. It should be noted at this time that the comparator is strobed by transistor 258. By the selection of the circuit parameters of the multivibrator 243, the frequency of pulse width of the signal shown at 120 of FIG. 4 can be altered. Also the selection of resistor 265 and capacitor 264 will determine the slope of the peaks of the sawtooth pulses 130. The output of the comparator 101 is present on conductors 270 and 105b with a complementary waveform of the output being present on 105a. The reason for having the complementary form will be demonstrated later, but its primary purpose is to be used in conjunction with the decoded lines for decoding the base control conductors 35, 37, 39 and 41.

The zero cross detect circuit 63 receives the output of the fundamental frequency reference oscillator that is present on conductor 57 from FIG. 3b and applies it to both the positive and negative zero detect voltage comparator 282. The negative going comparison is made for the voltage when the voltage on conductor 57 exceeds the negative bias level that is present at resistor 284 by the comparator 383. The current is limited to the comparator from conductor 57 by resistor 287 for the minus DC reference source (not shown) by resistor 284. Resistors 285 and 288 provide a voltage divider network when used in conjunction with resistors 284 and 287, respectively, and capacitors 286 and 289 provide decoupling of the high frequency noise that may be present on the conductor. When the absolute amplitude of the voltage on conductor 57 exceeds the reference voltage that is present at resistors 284 and 290 then the comparator provides a positive going pulse at node point 310 which is fed back to the input by resistors 283 and 296. There is a voltage division network established by resistors 290 and 291, and 293 and 294 with filtering being provided by capacitors 292 and 295. The pulses that appear at node 310 are coupled to the base of transistor switch means 300 by resistor 298 with biasing for the transistor being established by the current flowing through resistor 299. When transistor 300 turns on, it pulls the collector voltage that is developed across resistor 297 to ground and thus provides a negative going pulse on conductor 109a and the inverter amplifier 301 inverts the signal and provides a positive going pulse on conductor 109b. In addition to providing pulses on the two conductors 109a and 109b, the output of the zero cross detect circuit also provides a clock pulse to the J-K flip-flop 304, the pulse being coupled to the clock input of the J-K flip-flop 304 by resistor 302 and filtering of the circuit is provided by capacitor 321. The J-K flip-flop 304 is connected so it will toggle upon the occurrence of each pulse and thus provide polarity control signals on conductors 115 and 117.

The combining logic network consists of two four input NAND gates 307 and 308, and two three input NOR gates 305 and 306. Each logic element drives a switch drive circuit 311 and the decoded base control signals are present on conductors 35a, 37a, 39a and 41a.

The waveform 124 of FIG. 4 shows the output of the zero detect circuit where there are two zero detect pulses 150 which have a deadband represented at 151. The output of the J-K flip-flop 304 is represented by waveform 125 which is the signal present on conductor 115. Of course, the complementary form of waveform 125 will be present on conductor 117.

Referring back to FIG. 3c which shall be used in conjunction with FIG. 4 at this time, the logic NAND device 307 in conjunction with a drive circuitry 311, operates as an AND circuit and combines the waveforms that are represented in FIG. 4, which are waveform 120, waveform 123, waveform 124 and waveform 120, to obtain on conductor 35a the waveform shown at 126. It is obvious from this, that for a half cycle, the signal that is present on 35a provides a switch output that represents a pulse width modulated signal.

Logic NAND device 308 in conjunction with a drive circuit 311 is an AND circuit and combines the waveforms represented by the waveform 120, the waveform 123, the waveform 124 and inverted waveform 125 to obtain the waveform that is represented by waveform 128 which is the drive pulse for the second half of the waveform 122.

The NOR circuit 305 in conjunction with a switch drive circuit 311 operates as an OR circuit and provides the waveform represented by waveform 127 which is the OR of waveform 125, inverted waveform 123 and the inverted waveform 124. Similarly, logic NOR device 310 in conjunction with switch drive device 311 is used as an OR circuit and combines inverted waveform 125, inverted waveform 123 and an inverted waveform 124 to obtain the signal that is represented by waveform 129.

Figure 3D:
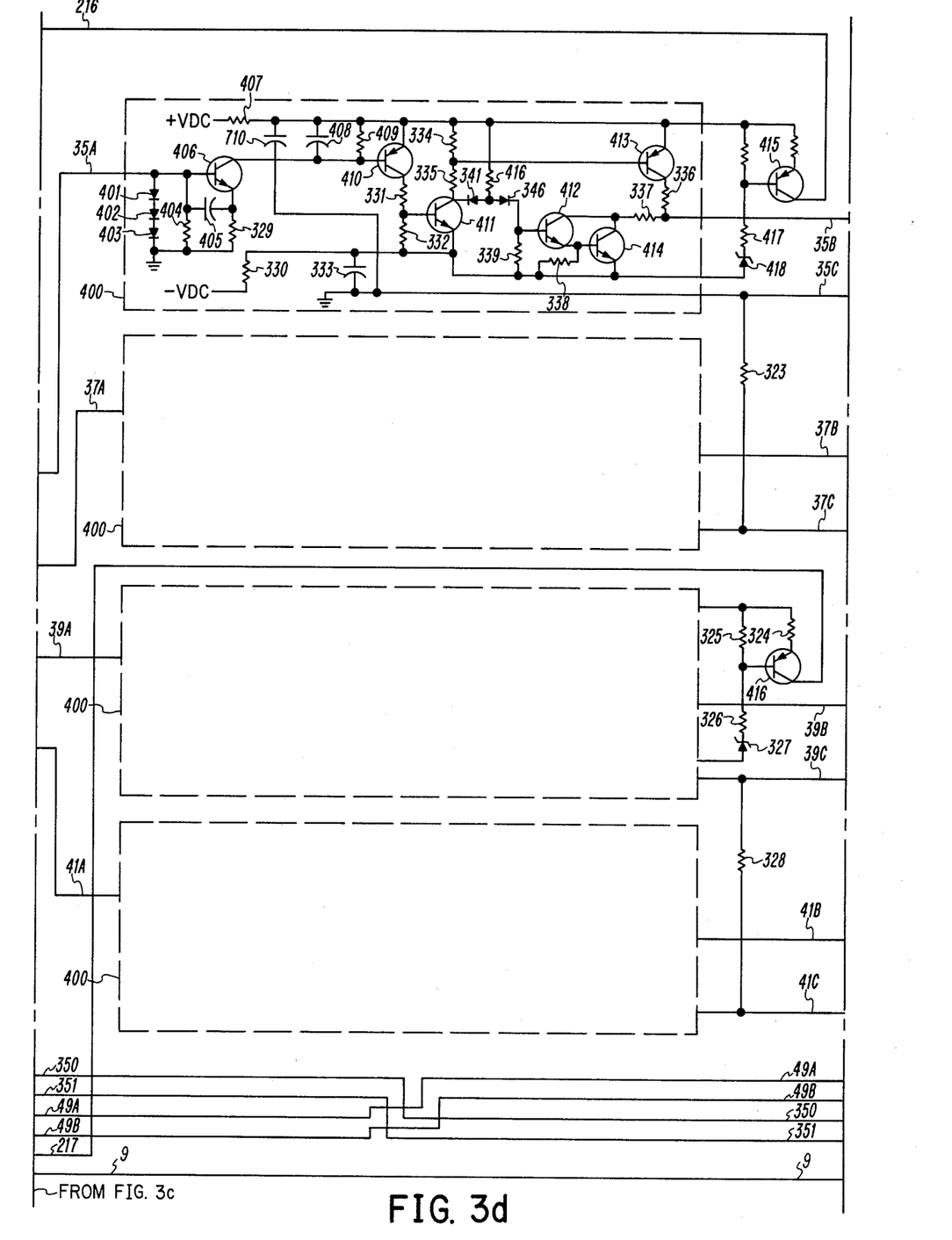
Figure 3E:
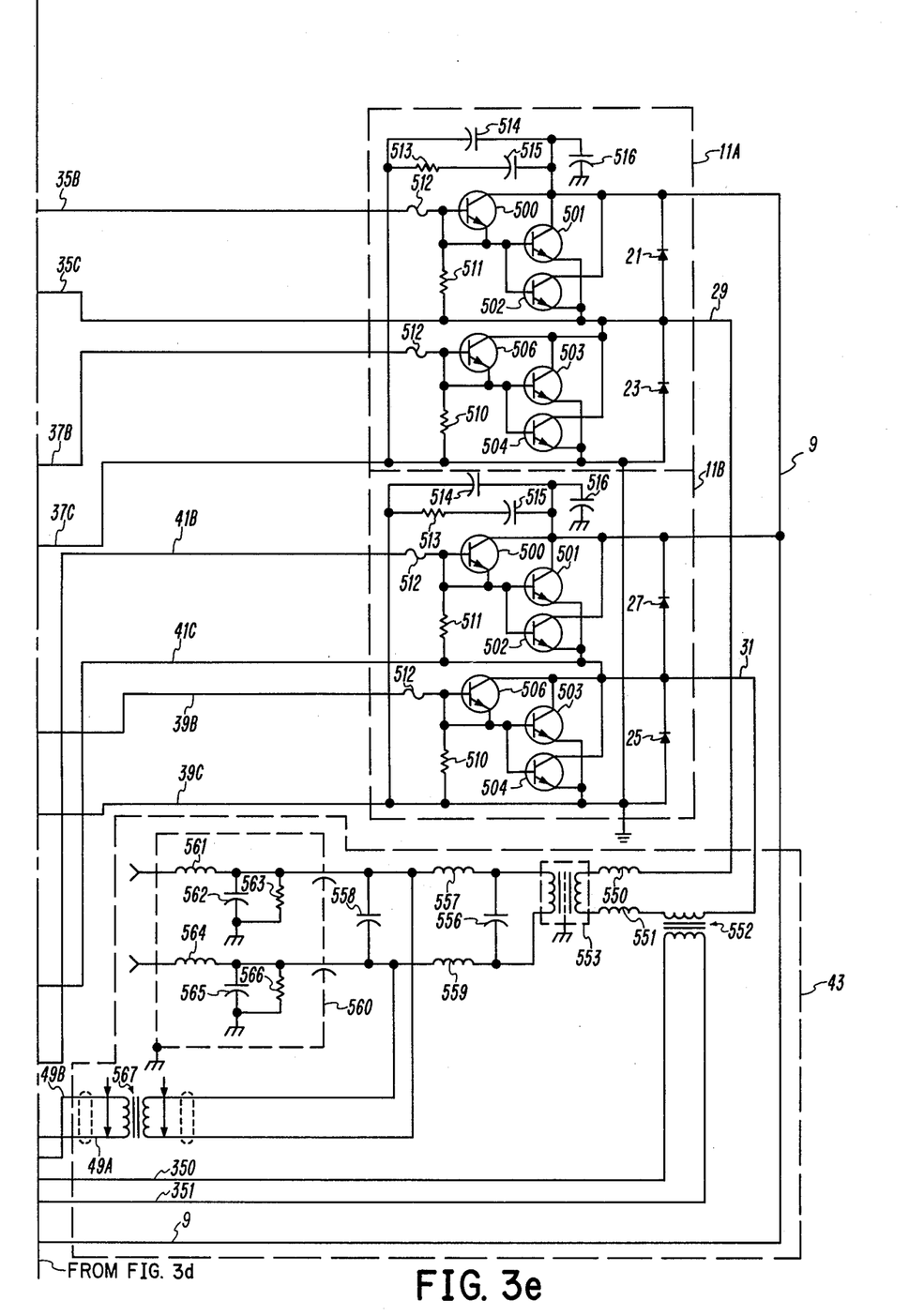

Eacn switch drive circuit 311 consists of a transistor device 317 and corresponds to the circuitry on FIG. 3d that involves transistors 406 through 415 and which will also correspond to FIG. 3e, transistors 500 through 502. When transistor 317 is in a conducting state, then no output signal appears on line 35a, therefore, none of the transistor drive circuitry 400 (FIG. 3d) is activated and as a result none of the transistors 500 through 502 (FIG. 3e) is activated. In order to turn on transistors 501 and 502 which are the main power devices that operate in parallel, it is required that transistor 317 (FIG. 3c) be in an off state. When that transistor is turned off, a turn-on signal on line 35a will still not appear until capacitor 320 has charged through resistor 319 to a voltage level which is greater than the threshold level of zener diode 321. The purpose for the delay time is to ensure that there is not simultaneous conduction between the parallel combination of transistors 501 and 502 with the parallel combination transistors 503 and 504 (FIG. 3e).

The presence of the control signal on line 35a causes transistor 406 (FIG. 3d) to turn on which in turn enables transistor 410 which in turn enables transistor 411. Transistor 411 then provides the base drive for transistor 413 which is the main driving element to the combination of transistors 500 through 502. Transistor 500 is a drive transistor for the parallel combination of transistors 501 and 502. The state of transistor 413 being on corresponds to the turn-on of transistors 500 through 502. When transistors 500 through 502 are to be turned off then transistor 414 is activated by transistor 412 which receives its bias current through resistor 416 by virtue of transistor 411 being in the off state which, in turn, corresponds to the absence of a control signal on line 35a.

The base drive circuitry of FIG. 3d is the interface between the logic drives of FIG. 3c and the power transistors of FIG. 3e, providing the function of current amplification and level shifting, and is powered by isolated plus and minus DC voltage (+VDC and −VDC) outputs from a low voltage power supply (not shown). If the isolated +VDC and −VDC voltages are not present, or if they are not sufficiently high, then there is improper turn-on and turn-off of the power devices which could result in a failed condition of the power stage. If these voltages are adequate, then the threshold of zener diode 418 is overcome and transistor 415 is allowed to conduct, providing a signal to transistor 235 of FIG. 3b by way of conductor 216. Biasing of transistor 415 is provided by resistors 416 and 417 and zener diode 418. Resistor 419 in conjunction with the voltage across resistor 416 and the base-emitter junction of transistor 415 establishes a current source through conductor 216 when the isolated +VDC and −VDC voltages are adequate.

In a similar fashion, transistor 416 in conjunction with resistors 324, 325 and 326 as well as zener diode 327 indicates the presence of the isolated +VDC and −VDC voltages for the base drive circuit 400 that is connected to conductor 39a providing a signal to transistor 236 by means of conductor 217. The +VDC and −VDC voltages which supply the base drive circuits 400 which are connected to conductors 37a and 41a are referenced to inverter ground and, hence, are monitored by the voltage comparison means 192 and associated normalization circuitry. Resistors 323 and 328 provide a resistive isolation between the common return lines of the base drive circuits 400.

In each of the base drive circuits 400, the transistor 406 is biased by diodes 401 and 403 and resistors 404 and 329. There is present an emitter to base capacitor 405 for decoupling purposes. Transistor 410 is biased by the current flow through resistor 409 and transistor 406 and utilizes capacitor 408 for decoupling. The collector is tied to a minus DC voltage by resistors 331, 332 and 330 in which the junction of resistors 331 and 332 provides the base bias to transistor 411. Filtering of the positive DC voltages is provided by capacitor 710 and rsistor 407. Capacitor 333 and resistor 330 provide filtering for the negative DC voltage. The collector of transistor 411 is tied to a positive DC voltage by means of resistors 334 and 335, and resistor 416 through blocking diode 341. Diode 346 and resistors 416 and 339 provide the biasing for transistor 412 wherein transistor 414 is biased by resistor 338. Transistor 403 is connected to conductor 35b by means of resistor 336 wherein resistor 337 connects the collectors of transistors 412 and 414 to conductor 35b. As was discussed earlier, the base drive circuit 400 provides an interface between logic levels and the drive levels necessary to switch the transistors embodied in the pass means 11.

Referring to FIG. 3e, the pass means 11 is divided up into two sections, 11a and 11b with the outputs from the base drive circuit 400 being presented across conductors 35b and 35c to operate the pass transistors which are in parallel with rectifier 21. The signal that is across conductors 37b and 37c operates the transistor pass means that is in parallel with rectifier means 23 and the signal that is across conductors 39b and 39c operates the pass transistors which are across diode 25. In a similar fashion the bridge circuitry is completed by the signal that is across conductors 41b and 41c operating the transistor pass switches that are across rectifier 27.

The block diagram 11a represents one side of the bridge configuration of the pass means and 11b represents the other side of the pass means. Filtering for each side is provided by capacitors 514, 515, and 516 and damping resistor 513. Biasing for the transistors 500 and 506 is provided by the current flow from the base drive circuits 400 in conjunction with resistors 510 and 511, respectively. Each of the base drive circuits is fault isolated by fuse means 512.

The output of the signal pass means that appears across conductors 29 and 31 is coupled to the output conditioner 43. Within the output conditioner there is filtering provided by inductors 550 and 551 and isolation provided by isolation transformer 553. The isolation transformer connects the output of the signal pass means 11 to the output filtering and electromagnetic interference suppression section that includes filter capacitors 558 and 556 and inductors 557 and 559. The electromagnetic interference suppression section 560 is a shielded device and in addition provides filtering which is included within the network that comprises inductors 561, 564 and capacitors 562 and 565 and resistors 563 and 566. Transformer 567 monitors the output and provides an analog signal across conductors 49a and 49b which is applied to the phase compensation network 87 on page 3b.

As a means of protecting the circuitry against current surges, there is a current transformer 552 which senses the current flow through conductor 31 and provides a signal on conductors 350 and 351. The signal that is present on 350 and 351 is applied to full wave rectifier 354 located in FIG. 3c where it is filtered by capacitors 358 and 360 and applied through blocking diode 356 to the cathode of diode 266 which is connected to the feedback line 270 into the voltage comparator means 259. If the current that flows through conductor 31 is inordinately high, the voltage that is developed across resistor 357 will disable the voltage comparator means 259. Resistor 359 provides impedance matching for comparator 259 and associated circuitry.

Figure 5:
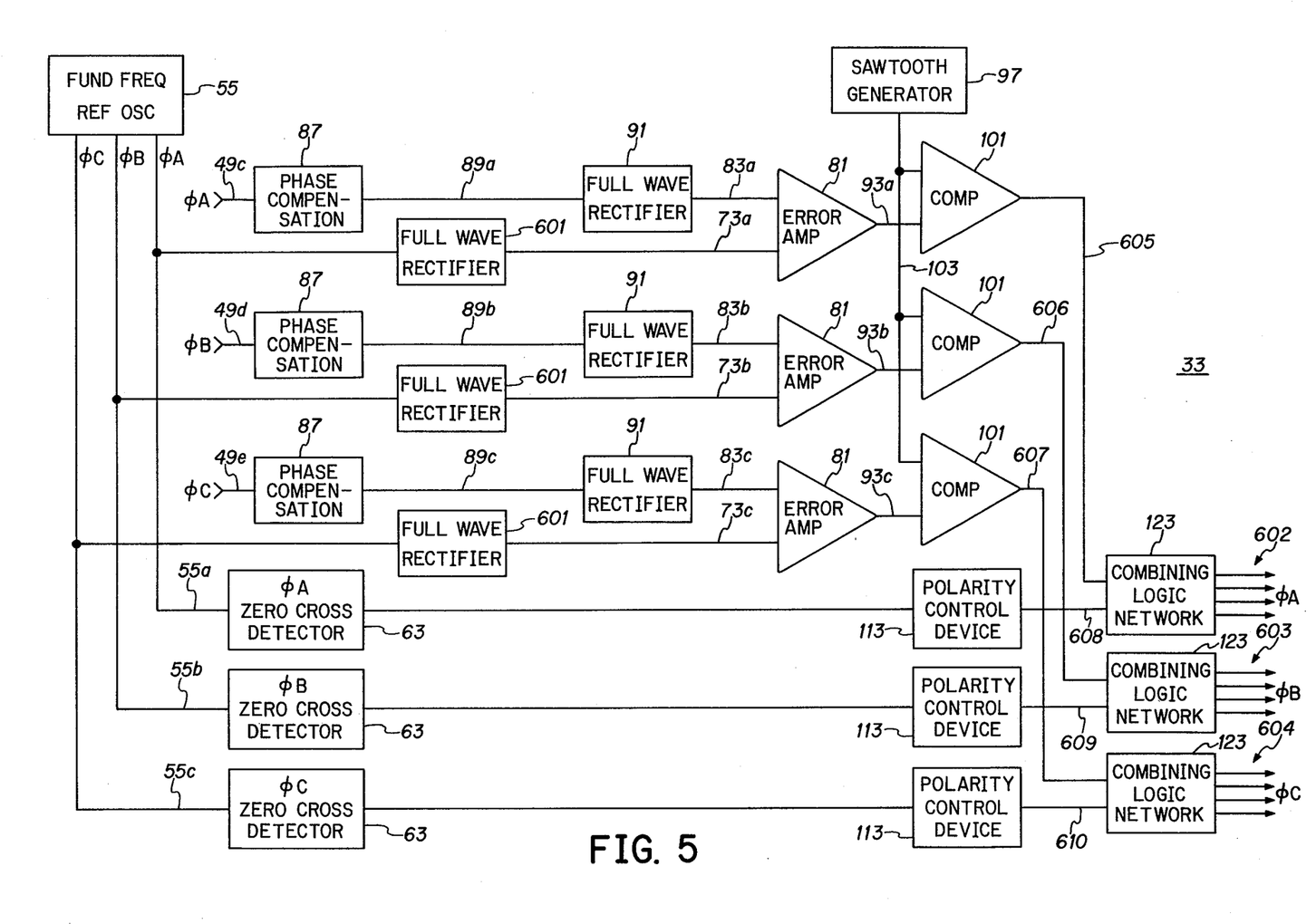
FIG. 5 is a block diagram of the signal generator and controller for a three phase inverter.

In the situation where a three phase converter output is required, there is provided in FIG. 5 a block diagram of a three phase signal generator and controller. Each phase has an error amplifier 81 that compares the rectified output from the corresponding output conditioner 43 for that phase to a reference signal that is a rectified alternating signal. Phase A is coupled by a conductor 49c to a phase compensation network 87 where there is, as in the case of FIG. 2, phase compensation performed upon the signal and the output is present on conductor 89a. Conductor 89a joins the phase compensation network to the full wave rectifier 91 which provides the phase A rectified signal on conductor 83a. Similarly, conductor 49d provides a signal from the phase B output conditioner to a phase compensation network 87 which is joined to a full wave rectifier 91 by means of conductor 89b with the full wave rectified signal of phase B being applied to an error amplifier 81 by means of conductor 83b. Phase C is treated similarly, and has in its loop a phase compensation network 87, a full wave rectifier 91 and an error amplifier 81. There is provided a fundamental frequency oscillator 55 which provides a three phase output upon conductors 55a, 55b and 55c respectively. Conductor 55a connects the phase A output from the fundamental frequency reference oscillator to the full wave rectifier 601 which provides the error amplifier with a full wave rectified signal by means of conductor 73a. In like fashion, phase B and phase C is applied to a full wave rectifier 601 and the rectified output is conducted to an error amplifier by means of a conductor 73b for phase B and 73c for phase C.

The output of each error ampifier 81 for each phase is applied to a phase comparator 101 which compares the error signal with a sawtooth signal that is generated by sawtooth generator 97. The resultant pulse width modulated signal is provided upon conductors 605, 606 and 607 for each of the corresponding phases and is conducted to a combining logic network 123.

Each of the phases that is developed by the fundamental frequency reference oscillator 55 is also applied to a zero cross detector 63 which detects the zero potential for each phase and provides a threshold or deadband. The output of the zero cross detector is applied to a polarity control device which provides the polarity control signal on conductor 608 to the combining logic network 123 for phase A, 609 for phase B and 610 for phase C.

The control signal to the signal pass means for phase A is provided by the conductor 602, phase B's signal pass means is controlled by conductor 603 and phase C's pass means is controlled by conductor 604.

It was noted earlier that the response time of the inverter, or converter, disclosed herein is substantially better than the prior art devices because there is a comparison made between rectified alternating current analog signals rather than comparing a DC signal with a DC reference. It has also been disclosed that to implement the teachings of this invention, it is preferred to use a fundamental frequency reference oscillator that provides a sinusoidal waveform that has the same frequency as the desired output signal from the inverter circuitry. However, in the case of a three phase system such as that disclosed in FIG. 5, as well as the embodiment of the invention disclosed by FIG. 2, it has been found that a three phase sinusoidal signal can easily be developed using digital-to-analog conversion techniques without departing from the scope of the invention.

Figure 6:
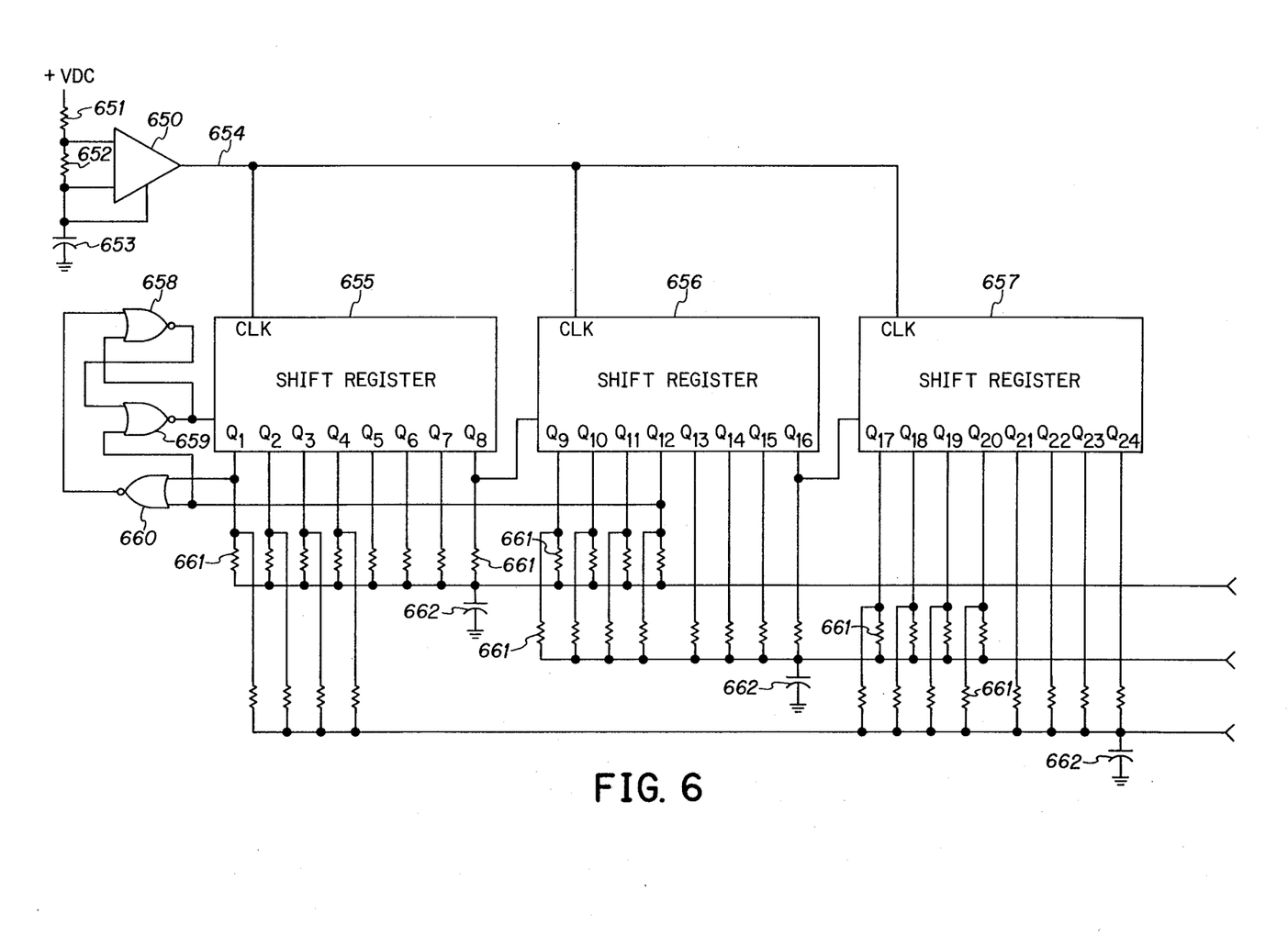
FIG. 6 is a schematic diagram of a three phase signal generator according to the embodiment of FIG. 5.

A fundamental frequency reference oscillator that can be used with a three phase inverter is shown in FIG. 6 and includes a local oscillator circuitry that provides a clock frequency substantially larger than the frequency of the output signal from the inverter. The clock signal in FIG. 6 is generated by a multivibrator circuit 650 whose period is controlled by the selection of resistors 651, 652 and capacitor 653. The output of the multivibrator 650 is applied to means of conductors 654 to a plurality of shift registers tied in series as is shown in FIG. 6 wherein there are three shift registers 655, 656 and 657 tied together. The outputs of the shift registers are tied to resistors 661 whose values are selected to provide a sinusoidal output on conductors 55a, 55b and 55c. The data that is applied into the first shift register 655 is provided by the latch that includes the NOR circuits 658 and 659 and the reset circuit which is provided by NOR gate 660. In this type of digital-to-analog converter, it is necessary to filter the output that is present on conductors 55a, 55b and 55c and this is provided by capacitors 62.

An added advantage of using the fundamental frequency reference oscillator of FIG. 6 is the fact that the zero detect levels can be obtained by combining selected outputs from the shift registers 655, 656 and 657 for each phase and thus eliminate the more complicated zero detect circuit that was disclosed in FIG. 3.

Many changes and modifications in the above-described embodiment of the invention can, of course, be carried out without departing from the scope thereof. Accordingly, the scope is intended to be limited only by the scope of the appended claims.

What is claimed is:

1. Signal converter means, comprising:
controllable four port signal pass means having two input ports, two output ports and at least a pair of control terminals;
full wave rectifier means connected across the two output ports;
means for generating a rectified alternating current reference frequency signal;
first arithmetic means connected to the means for generating the rectified alternating current reference signal and the full wave rectifier means to provide an error signal that is the difference between the rectified alternating current reference frequency signal and the output of the full wave rectifier means;

means for generating a first signal whose amplitude repeatedly increases from a reference level with time for a predetermined period and then returns to the reference level;

comparator means for comparing the first signal with the error signal and to provide a first state output when the first signal is less than the error signal and to provide a second state output when the first signal is greater than the error signal;

polarity control means for controlling the polarity of the signal on the two output ports;

means for combining the output of the comparator means with the output of the polarity control means, the output of which provides at least two control signals; and means for applying the control signals to the control terminals whereby in response to the control signals, the controllable four port signal pass means transfers a signal on the input ports of the output ports.

2. The signal converter means according to claim 1 wherein the means for generating a rectified alternating current reference frequency signal, comprises:

means for generating an alternating current signal; rectifier means; and means for connecting the output of the means for generating an alternating current signal to the rectifier means whereby a rectified signal is obtained and used as the rectified alternating current reference signals.

3. The signal converter means according to claim 1 wherein the means for generating a rectified alternating current reference frequency signal, comprises:

sine-wave oscillator;
first diode;
180° phase shift means;

means for connecting the output of the sine wave oscillator to the first diode means and the 180° phase shift means;

second diode;

means for connecting the output of the 180° phase shift means to the second diode; and means for connecting a second terminal of the first and second diodes together, whereby at the connection of the two diodes there is produced a rectified signal of the output from the sine wave oscillator.

4. A method of signal converting comprising:

applying an input signal that is to be converted across the input ports of a controllable four port signal pass means having two output ports and at least a pair of control terminals;

obtaining a rectified output signal from the signal that is present across the two output ports;

generating a rectified alternating current reference signal;

comparing the rectified output signal with the rectified alternating current reference frequency signal obtaining an error signal therefrom;

generating a first signal whose amplitude repeatedly increases from a reference level with time for a predetermined period and then returns to the reference level;

comparing the first signal with the error signal providing a first state output when the first signal is less than the error signal and providing a second state output when the first signal is greater than the error signals;

generating a polarity control signal having two states;

combining the first state output and the second state output with a first state of the polarity control signal obtaining a first control signal;

combining the first state output and the second state output with a second state of the polarity control signal obtaining a second control signal; and controlling the controllable four port signal pass means with the first and second control signals.

* * * * *